United States Patent [19]

Suzuki

[11] 4,176,059

[45] Nov. 27, 1979

[54] ANTI-CORROSION COMPOSITION FOR USE IN AQUEOUS SYSTEMS

[75] Inventor: Fumiko Suzuki, Guelph, Canada

[73] Assignee: Quatic Chemicals Limited, Guelph, Canada

[21] Appl. No.: 913,555

[22] Filed: Jun. 8, 1978

[51] Int. Cl.$^2$ .......................... C02B 5/04; C02B 5/06; C23F 11/08

[52] U.S. Cl. ..................................... 210/58; 252/181; 252/389 A; 252/391; 252/392; 422/16; 422/18; 422/19

[58] Field of Search .................... 210/54, 57, 58, 59; 252/180, 181, 389 R, 389 A, 390–392; 422/15–19

[56] References Cited

U.S. PATENT DOCUMENTS

| | | | |
|---|---|---|---|
| 2,736,658 | 2/1956 | Pfohl et al. | 106/14 |
| 3,891,568 | 6/1975 | Mishio et al. | 252/180 |
| 3,931,043 | 1/1976 | Walker et al. | 252/180 |
| 3,935,125 | 1/1976 | Jacob | 252/389 A |
| 4,101,441 | 7/1978 | Hwa et al. | 210/58 |

FOREIGN PATENT DOCUMENTS

| | | | |
|---|---|---|---|
| 939135 | 1/1974 | Canada. | |
| 943752 | 3/1974 | Canada. | |
| 994544 | 8/1976 | Canada. | |
| 997132 | 9/1976 | Canada. | |
| 898820 | 6/1962 | United Kingdom | 210/58 |

*Primary Examiner*—Charles N. Hart
*Assistant Examiner*—Peter A. Hruskoci
*Attorney, Agent, or Firm*—Hirons, Rogers & Scott

[57] ABSTRACT

A low toxicity, corrosion and scale inhibiting composition for use in recirculating aqueous systems, e.g. in heat exchangers, comprises from about 3–1,000 parts by weight of molybdate, from about 0.5–1,000 parts by weight of an organic cationic or non-ionic surfactant, from about 0.3–1,000 parts by weight of a water soluble polyphosphate and from about 0.05–500 parts by weight of an azole, for example tolyltriazole. The composition is water soluble or water dispersible, and is effective in very small amounts (3–3,500 ppm) for corrosion control of metals such as carbon steel, copper and aluminum exposed to circulating water.

13 Claims, No Drawings

ANTI-CORROSION COMPOSITION FOR USE IN AQUEOUS SYSTEMS

FIELD OF THE INVENTION

This invention relates to corrosion inhibiting compositions for use in aqueous systems, and processes of inhibiting or controlling corrosion using such compositions. More particularly, it relates to compositions useful in treating recirculating aqueous systems where waters contact metal surfaces under oxidizing conditions, so as to reduce or control the corrosion caused in such aqueous systems.

BACKGROUND OF THE INVENTION

In a substantial variety of industrial processes, it is necessary to contact metal surfaces with circulating water in the presence of air. This occurs, for example, in heat transfer water systems where water is used for heating and cooling purposes, e.g. in heat exchangers, cooling towers, chillers, distillation and condensation water systems. In many cases, the water is recirculated from a reservoir over metal surfaces of the apparatus to effect cooling and heating thereof. Since the water is saturated or nearly saturated with oxygen in many cases, the conditions promote corrosion of the metal. Metals commonly used in such apparatus include iron, aluminum, copper and alloys of such metals, two or more of which metals or alloys are normally present in the same apparatus, and all of which are subject to corrosion.

In addition, in such processes, scale deposition is liable to occur on the metal surfaces due to hardness producing cations such as calcium, magnesium and the like dissolved in the water ("hard" water). Such scale deposition inhibits the heat transfer capability of the metal surfaces, and should accordingly be minimized.

DESCRIPTION OF THE PRIOR ART

Since such metal corrosion is a serious problem from an economic and industrial point of view, many attempts to reduce it have been made in the past. One approach to the problem is the addition of corrosion inhibiting chemicals. Commonly used chemicals for this purpose include sodium nitrite, chromates, silicates, borates, zinc compounds, phosphates of various types, and azole compounds.

Environmental standards for chemical discharges limit the utility of many of these previously used chemicals, because of their potential hazards to the environment. For example, chromates, zinc compounds and azoles are toxic. Cooling water discharges containing chromate or zinc-based corrosion inhibitors need to be properly treated to remove these chemicals, which adds substantially to the cost of their use.

The use of sodium nitrite for this purpose tends to cause serious bacterial growth, resulting in the decrease in the effective concentration of the chemical and pipe clogging. Polyphosphates when used as corrosion inhibitors need to be present in relatively high concentrations, and tend to cause scale and sludge problems. Silicates and borates also need to be present in relatively high concentrations.

Compositions comprising mixtures of various chemical ingredients have also been proposed. For example, in U.S. Pat. No. 3,891,568 Nishio et al, there is disclosed the use of low-toxicity chemicals such as molybdates instead of toxic chromates and zinc compounds, along with a phosphonate, an alkali metal mercaptobenzothiazole or benzotriazole. This is a relatively expensive composition, which needs to be used in substantial quantities in order to be sufficiently effective especially for metals which are relatively susceptible to corrosion, e.g. low carbon steels, aluminum alloys, etc. The additional use of a polyacrylate or polyacrylamide is also proposed by Nishio et al, in order to provide improved scale control. This is claimed to be a synergistic corrosion inhibiting composition.

U.S. Pat. No. 3,931,043 Walker et al discloses a corrosion inhibiting composition which incorporates ethoxylated beta amines and diamines, which are low-toxicity compounds.

Canadian patent No. 997,132 Seffens discloses the use, as corrosion inhibitor, of a composition comprising an organic solvent and imidazoline compound.

SUMMARY OF THE INVENTION

It is an object of the present invention to provide novel anti-corrosion compositions for use in aqueous systems.

It is a further object to provide such a composition which is based upon low-toxicity chemicals and which is effective at low levels of such chemicals.

The present invention provides a novel, four-component corrosion inhibiting composition of outstanding efficacy both in corrosion inhibition and in scale reduction. The four components have a synergistic action when used in combination in aqueous sysems. No additional anti-scalants are necessary in normal conditions. Briefly, the four components of the composition are a water soluble molybdate, an organic surfactant, a polyphosphate and an azole compound.

Thus according to the one aspect of the present invention, there is provided a water treatment composition for addition to water for contacting metal surfaces to inhibit corrosion thereof, said composition comprising:
  from about 3 to about 1000 parts by weight of water soluble molybdate ion;
  from about 0.5 to about 1,000 parts by weight of at least one water soluble or dispersible organic non-ionic or cationic surfactant;
  from about 0.3 to about 1000 parts by weight of a water soluble polyphosphate;
  and from about 0.05 to about 500 parts weight of an azole selected from the group consisting of triazoles, pyrazoles, imidazoles, isooxazoles, isothiazoles, thiazoles and thiadiazoles.

According to another aspect of the present invention, there is provided a process of inhibiting the corrosion of metal surfaces exposed to circulating water systems, which comprises including in one million parts by weight of the aqueous system a corrosion inhibiting, substantially water soluble amount, in the range from about 3 to about 3,500 parts by weight, a water treating chemical composition comprising:
  from about 3 to about 1000 parts by weight of water soluble molybdate ion;
  from about 0.5 to about 1,000 parts by weight of at least one water soluble or dispersible organic non-ionic or cationic surfactant;
  from about 0.3 to about 1000 parts by weight of a water soluble polyphosphate;
  and from about 0.05 to about 500 parts by weight of an azole selected from the group consisting of triazoles, pyrazoles, imidazoles, isooxazoles, isothiazoles, thiazoles and thiadiazoles.

The present invention thus provides a corrosion inhibiting composition which is effective at very low concentrations in water. The use of low concentrations is highly desirable, since it reduces toxicity problems with effluents from the system, as well as reducing the overall cost of the process.

The use of molybdates in such compositions and processes is particularly advantageous because of their low toxicity. Previous reports on their use, however, have indicated somewhat low efficacy in corrosion protection, at low concentrations. They tend to be relatively expensive. In the composition of the present invention, however, in which the molybdates are used in conjunction with a suitable surfactant and other chemicals they can be used at very low concentrations, and give a compositions of high efficacy for the purpose.

DESCRIPTION OF THE PREFERRED EMBODIMENT

The surfactants useful in the composition of the present invention are selected from one of the following groups:

(i) surfactants of general formula:

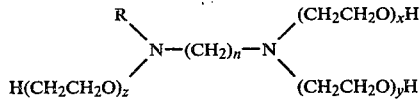

wherein

R represents a saturated or unsaturated hydrocarbon radical having from 8 to 20 carbon atoms;

n is an integer from 1 to 10;

x, y and z are integers of sum 0 to 15;

Preferred types of surfactants in this group are those marketed under the trademarks "Duomeen T" (x+y+z=0), "Ethoduomeen T/13" (x=y=z=3) and "Ethoduomeen T/20" (x+y+z=10). The alkyl radicals of these surfactant compounds are understood to be derived from tallow. According to data supplied by the manufacturer, a typical composition of their alkyl radicals is 3% myristyl, 0.5% pentadecyl, 29.5% palmityl, 1% margaryl, 23.5% stearyl, 1% myristoleyl, 3% palmitoleyl, 37% oleyl and 1.5% linoleyl. Salts of the above compounds such as acetate are also among the preferred surfactants of this group.

(ii) surfactants of general formula:

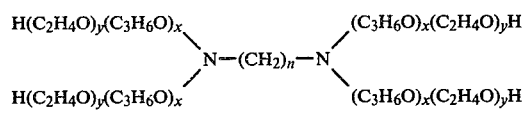

wherein n is an integer from 1 to 10;

each x represent an independently selected integer such that the average molecular weight of each group ($C_3H_6O$) is from about 3,000 to about 10,000; and each y represents an independently selected integer such that the polyethylene oxide groups ($C_2H_4O$) constitute from about 10% to about 30% of the total molecular weight of the surfactant molecule.

Preferred surfactants of this group are those marketed under the trademark "Tetronic" which are surfactants meeting the above formula in which n=2, and being available in at least the following suitable specific forms:

Tetronic 902—average molecular weight of ($C_3H_6O$)=c.3750, weight percent ($C_2H_4O$) in the molecule=c.20;

Tetronic 1102—average molecular weight of ($C_3H_6O$)=c.4750, weight percent ($C_2H_4O$) in the molecule=c.20;

Tetronic 1301—average molecular weight of ($C_3H_6O$)=c.5750, weight percent ($C_2H_4O$) in the molecule=c.10;

Tetronic 1302—average molecular weight of ($C_3H_6O$)=C.5750, weight percent ($C_2H_4O$) in the molecule=c.20;

Tetronic 1502—average molecular weight of ($C_3H_6O$)=c.6750, weight percent ($C_2H_4O$) in the molecule=c.20;

(iii) surfactants of general formula

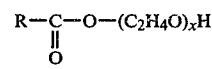

in which

R represents a saturated or unsaturated aliphatic hydrocarbon radical having from 8 to 20 carbon atoms;

x is an integer from about 90 to about 140.

Preferred among this group are those sold under the trademarks KESSCO PEG 4000 monostearate, monooleate and monolaurate, and KESSCO PEG 6000 monostearate, monooleate and monolaurate;

and (iv) ethylene oxide-propylene oxide polymers having a molecular weight of from about 2000 to about 5000. Preferably such polymers have a molecular weight in the 2700–4000 range. Block polymers of configuration ethylene oxide - propylene oxide - ethylene oxide are included in this group. Specific suitable examples of surfactants in this group are sold under the trademarks "Pluronic L61", "Pluronic 25R2" and "Pluronic 31R1".

It is preferred to use amounts of surfactant in the range 0.5-100 parts by weight in the composition of the invention to provide an amount of from 0.5-100 parts per million surfactant in the water system.

In certain instances it may be found desirable to include in the composition of the invention more than one surfactant, from more than one of the above groups. This may occur, for example, where foaming problems are encountered.

The polyphosphates used in this invention are of the water soluble type. The preferred type is glassy polyphosphate commercially available under various tradenames such as Calgon and Ercophos. The principal ingredient therein is $(NaPO_3)_6$. The preferred amount of polyphosphate is from 0.3-100 parts by weight, to provide about 0.3 to 100 parts per million polyphosphate in the water system.

The water soluble molybdate used in the present invention can be substantially any salt of molybdate which is readily soluble in water. Preferred are magnesium molybdate, ammonium molybdate and alkali metal molybdates such as lithium molybdate, sodium molybdate and potassium molybdate. Most preferred is sodium molybdate. Throughout this specification and claims, the molybdate amounts refer to molybdate ion rather than molybdate compound in total. Preferred amounts of molybdate ion are from about 3 to about 100 parts by weight to provide molybdate ion concentrations in the water system of 3-100 parts per million.

The azole compound to be used in the invention is selected from among the groups triazoles, pyrazoles, imidazoles, isooxazoles, isothiazoles, thiazoles, thiadiazoles and the like. Specific preferred such compounds include 1,2,3-benzotriazole; 1,2,3-tolyltriazole; sodium 2-mercaptobenzothiazole; and sodium 2-mercaptobenzimidazole. Preferred amounts of azole compound are from about 0.05-30 parts by weight to provide azole concentrations in the water system of 0.05-30 ppm.

It is of course within the scope of the present invention to use two or more or any of the present types of compounds, specified above, where individual conditions and applications so indicate. However, it is not usually of economic advantage to do so when more than one compound of a specified type is used in the composition of the invention; the amounts referred to herein relate to the total amount of compounds of the specified type.

In using the composition of the present invention, it is preferred to prepare initially a pre-mixture of the four ingredients in the desired proportion, under agitation and then add the calculated quantity of this pre-mixture to the process water. In a recirculatory system, it is desirable to monitor the process water, on a continuous or periodic basis, so as to check the concentration of the composition, and make the necessary adjustment additions to compensate for losses due to blow down, drift and evaporation. If desired however, one or more of the ingredients of the composition can be added separately to the process water.

A particularly preferred way of using the composition of the invention is to mix the ingredients, in the desired proportion, into a dilute aqueous solution, e.g. a 10% solution of the composition. The required small quantities of composition according to the invention can be most conveniently measured for addition by use of such dilute solutions.

The maximum amounts of composition according to the invention which are added to the circulating water is largely dictated by economic considerations. Whilst excessive amounts of ingredients can be added without harming the efficiency of the composition, they are unnecessary, and may lead to environmental problems. Also, use of such large amounts of any ingredient that it comes out of aqueous solution in the water system is to be avoided. The minimum effective amounts are very low, but depend to some extent upon the specific metal. Lower amounts are effective with copper and its alloys than with carbon steel. The preferred amount of composition according to the invention, for use in the circulating water system, is from 4-75 parts of composition, per million parts of water system.

The composition and process are further described in the following illustrative examples.

DETAILED DESCRIPTION OF THE SPECIFIC PREFERRED EMBODIMENTS

EXAMPLE 1

Tests of corrosion inhibition effected an aqueous systems containing compositions according to the invention were conducted using an aqueous formulation simulating that encountered in a cooling tower system. Compositions in accordance with the invention, and outside the scope of the invention, were tested in similar manner, to obtain controls and comparisons. The test water has the following analysis:

800-1000 total dissolved solids;
450 ppm total hardness as $CaCO_3$;
200 ppm chlorides;
220 ppm sulfates;
pH 7-8.

The test equipment comprised a reservoir, a pump, a heat exchanger and a corrosion measuring chamber. Test water composition is pumped from the reservoir and passed through the heat exchanger and the corrosion measuring chamber. After flow through these units, the water composition is returned to the reservoir for recirculation. The linear water velocity in the corrosion measuring chamber was c. 0.85 m/sec. The temperature at the point of corrosion measuring probe was $48\pm0.5°$ C.

Corrosion rate measurements were conducted using a Magna Corrater, which is a polarization resistance method. A Corrater probe is inserted into the flowing water. The probe has two electrodes protruding from the forward end of its body, the electrodes being put into contact with the flowing water. A small millivolt potential is applied across the electrodes, so as to increase slightly the anodic and cathodic activities occurring on their respective surfaces. The resultant small current which flows through the test water is measured by the Corrater meter. When using sufficiently small applied voltages, the current generated in the Corrater, which relates to the resistance to current flow at the interface between the electrode surface and solution, is directly proportional to the corrosion rate. The method correlates well with the conventional "weight loss coupon" method of corrosion measurement, and permits much faster measurements. Readings from the Corrater meter are obtained instantly and continuously recorded on a recorder chart.

The Corrater also registers "pitting index". The reading is a measure of the asymmetry of the two identical electrodes in the probe, which is caused by the tendency of the system to cause pitting-type corrosion. The pitting index does not provide the actual measure of pitting-type corrosion taking place in the system. The index is a relative indication of the tendency of pitting-type corrosion and is useful to predict the future occurrence of localized corrosion and the development of general corrosion in the system.

A description of the Corrater method is given in "Anti-Corrosion", June/July 1975, pages 9-11, in an article entitled "Introduction to Corrosion Measurement Techniques", by C. F. Britton.

The formulations used and the results obtained are shown in Table 1. In each case, the reported amount of each ingredient is in parts per million by weight, of the total amount of water circulating through the test apparatus. The corrosion rates shown are these at a steady state (approximately 2-6 days after the start of each test).

TABLE I

| Experiment Reference | Molybdate and Amount | Azole and Amount | Polyphosphate and Amount | Detergent and Amount | Corrosion Rate, in mils per yr | |
|---|---|---|---|---|---|---|
| | | | | | General | Pitting Index |
| A | Sodium Molybdate 30 ppm as $MoO_4^-$ | Tolyltriazole 1 ppm | Sodium Hexametaphosphate 5 ppm | Ethoduomeen T/13 10 ppm | 2—2.5 | <0.5 |
| B | Sodium Molybdate 30 ppm as $MoO_4^-$ | Tolyltriazole 1 ppm | Sodium Hexametaphosphate 5 ppm | Tetronic 1302 10 ppm | 4–5 | <1.0 |
| C | Sodium Molybdate 30 ppm as $MoO_4^-$ | Tolyltriazole 1 ppm | Sodium Hexametaphosphate 5 ppm | PEG Monostecoate 10 ppm | 10 | <0.2 |
| D | Sodium Molybdate 30 ppm as $MoO_4^-$ | Tolyltriazole 1 ppm | Sodium Hexametaphosphate 5 ppm | Pluronic 31R1 10 ppm | 7.5 | 0.5–1.5 |
| E | Sodium Molybdate 30 ppm as $MoO_4^-$ | Benzotriazole 1 ppm | Sodium Hexametaphosphate 5 ppm | Ethoduomeen T/20 10 ppm | 5.0 | 0.5 |
| F | — | — | — | — | 15 | 8–15 |
| G | Sodium Molybdate 30 ppm as $MoO_4^-$ | — | — | — | 10 | 5 |
| H | Sodium Molybdate 30 ppm as $MoO_4^-$ | Tolyltriazole 1 ppm | Sodium Hexametaphosphate 5 ppm | — | 11 | 4 |
| I | — | — | — | Ethoduomeen T/13 10 ppm | 14.5 | 2 |

When the same experiment was run using a conventional zinc-chromate corrosion inhibiting composition, to form a water formulation containing 40 pm $CrO_4^-$, 5 ppm $Zn^-$, 2.5 ppm polyphosphate, a reading of 3.5 mils per year general corrosion rate and 0 pitting index was obtained.

The formulation according to the invention exemplified in experiments A–E above, thus show corrosion inhibiting properties in aqueous formulations substantially equivalent to conventional chromate formulations, but at significantly lower total amounts of additive. Moreover, the toxicity problems experienced with conventional chromate and zinc-base formulations are very materially reduced with the formulations of the present invention.

The above results also appear to show synergistic actions between the various ingredients of the composition of the invention. Thus, elimination of the detergent (Experiment H) leads to a marked deterioration in performance, whilst the use of detergent alone (Experiment I) does not show results to compensate. Moreover, a comparison of the results of Experiments G and H tend to indicate that the addition of the azole and the polyphosphate to the molybdate has little effect at the relatively low concentrations of chemicals used, unless the detergent is present as well. The use of the detergent reduces the chemical concentrations necessary for effective corrosion control.

EXAMPLE 2

Compositions in accordance with the invention, and control compositions, were tested experimentally for their antiscaling properties. For this purpose, a test water was prepared, total volume 3 gallons, containing 1000 ppm calcium carbonate, and having a pH of 8.3–8.5. Its temperature in the vessel of scale deposition was adjusted to 65±3° C. The vessel (Pyrex glass, 500ml) was heated from outside using an electrical heating coil therein, and water was circulated through a test apparatus at a rate of 0.5 gal/hr., the apparatus including a reservoir, a pump, a scale measuring vessel and a flow meter. Scale deposited on the inside wall of the vessel was evaluated after seven hours. The results are given in Table II. In experiments K and L, the formulations are in accordance with the present invention. Experiment J is a blank, in which no chemical anti-scalant was added. The percentage scale inhibition in Experiment J is determined by dissolving the scale deposited on the vessel in an acid solution and by titrating it for calcium, so as to refer to this as complete scaling. Then calcium concentration of scale deposited in the other experiments is determined and the difference from the result obtained in Experiment J divided by the result obtained in Experiment J is expressed as a percentage of scale inhibition. The formulations used in Experiments M, N, O, P and Q are typical commercially available anti-scalants.

TABLE II

| Experiment Reference | Chemicals Added and Amounts | % Scale Inhibition |
|---|---|---|
| J | — | 0 |
| K | Sodium molybdate, 30 ppm (as $MoO_4^-$); | |

TABLE II-continued

| Experiment Reference | Chemicals Added and Amounts | % Scale Inhibition |
|---|---|---|
| | mercaptobenzothiazole, 1 ppm; Sodium hexametaphosphate, 5 ppm; Tetronic 1302, 10 ppm | 98.6 |
| L | Sodium molybdate, 15 ppm (as $MoO_4^{--}$); mercaptobenzothiazole, 0.5 ppm; sodium hexametaphosphate, 2.5 ppm; Tetronic 1302, 5 ppm | 97.2 |
| M | Sodium hexametaphosphate, 5 ppm | 89.5 |
| N | Ethylenediaminetetracetic acid-2Na, 8ppm | 30.4 |
| O | Sodium polyacrylate ("Antiprex A"), 9 ppm | 96.3 |
| P | 1-hydroxylethylidene-1,1-diphosphonic acid ("Dequest 2010"), 9 ppm | 99.2 |
| Q | Polyacrylamide ("Cyanamer P-35"), 9 ppm | 89.1 |

These results show that the composition of the invention are comparable to the best commercially available anti-scalants, so that they can be used as such. The compositions are effective as both corrosion inhibitors and anti-scalants, at the same concentrations, so that separate chemicals for anti-scalant purposes do not need to be used in the invented compositions.

It will of course understood that the above specific examples are given for illustration purposes only, and are not to be construed as limiting. The scope of the present invention is limited only by the scope of the appended claims.

What I claim is:

1. A water treatment composition for addition to water for contacting metal surfaces to inhibit corrosion thereof and deposition of scale thereon, said composition consisting essentially of:

from about 3 to about 100 parts by weight of water soluble molybdate ion, from about 0.5 to about 100 parts by weight of at least one water soluble or dispersible organic non-ionic or cationic surfactant said surfactant being selected from the group consisting of:

(i) surfactants of the general formula:

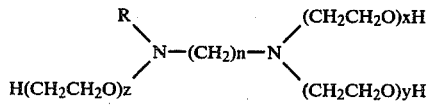

wherein R represents a saturated or unsaturated hydrocarbon radical having from 8 to 20 carbon atoms; n is an integer from 1 to 10; x, y and z are integers of sum 0 to 15;

(ii) surfactants of the general formula:

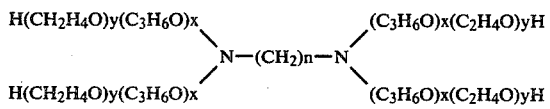

wherein n is an integer from 1 to 10; each x represents an independently selected integer such that the average molecular weight of each group ($C_3H_6O$) is from about 3,000 to about 10,000; each y represents an independently selected integer such that the polyethylene oxide groups ($C_2H_4O$) constitute from about 10% to about 30% of the total molecular weight of the surfactant molecule;

(iii) surfactants of the general formula:

$$R-\underset{\underset{O}{\|}}{C}-O-(C_2H_4O)xH$$

in which R represents a saturated or unsaturated aliphatic hydrocarbon radical having 8 to 20 carbon atoms; x is an integer from about 90 to about 140; and (iv) ethylene oxide-propylene oxide polymers having a molecular weight of from about 2000 to about 5000;

from about 0.3 to about 100 parts by weight of an inorganic water soluble polyphosphate;

and from about 0.05 to about 30 parts by weight of an azole selected from the group consisting of triazoles, pyrazoles, imidazoles, isooxazoles, isothiazoles, thiazoles and thiadiazoles, said composition being effective in corrosion inhibition when added to water in amounts of from about 3 to about 330 parts of composition per million parts of water.

2. The composition of claim 1 wherein the water soluble molybdate ion is added as a molybdate selected from the group consisting of sodium molybdate, potassium molybdate, magnesium molybdate and ammonium molybdate.

3. The composition of claim 2 wherein the water soluble polyphosphate is a glassy polyphosphate.

4. The composition of claim 3 wherein the azole is selected from the group consisting of 1,2,3,-benzotriazole; 1,2,3-tolyltriazole; sodium 2-mercaptobenzothiazole; and sodium 2-mercaptobenzimidazole.

5. The composition of claim 4 wherein the molybdate ion is added as sodium molybdate.

6. The composition of claim 5 wherein the polyphosphate is sodium hexametaphosphate.

7. A process of controlling metal corrosion and scale deposition of metal surfaces exposed to aerated aqueous systems, which comprises including in one million parts by weight of the aqueous system a corrosion and scale inhibiting, substantially water soluble amount in the range from about 3 to about 330 parts by weight of a composition consisting essentially of:

from about 3 to about 100 parts by weight of water soluble molybdate ion, from about 0.5 to about 100 parts by weight of at least one water soluble or dispersible organic non-ionic or cationic surfactant said surfactant being selected from the group consisting of:

(i) surfactants of the general formula:

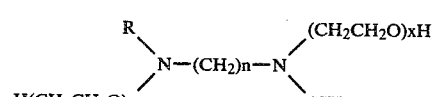

wherein R represents a saturated or unsaturated hydrocarbon radical having from 8 to 20 carbon atoms; n is an integer from 1 to 10; x, y and z are integers of sum 0 to 15;

(ii) surfactants of the general formula:

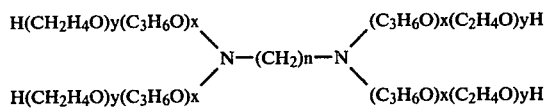

wherein n is an integer from 1 to 10; each x represents an independently selected integer such that the average molecular weight of each group ($C_3H_6O$) is from about 3,000 to about 10,000; each y represents an independently selected integer such that the polyethylene oxide groups ($C_2H_4O$) constitute from about 10% to about 30% of the total molecular weight of the surfactant molecule;

(iii) surfactants of the general formula:

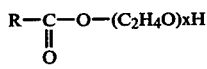

in which R represents a saturated or unsaturated aliphatic hydrocarbon radical having 8 to 20 carbon atoms; x is an integer from about 90 to about 140; and (iv) ethylene oxide-propylene oxide polymers having a molecular weight of from about 2000 to about 5000;

from about 0.3 to about 100 parts by weight of a water soluble inorganic polyphosphate;

and from about 0.05 to about 30 parts by weight of an azole selected from the group consisting of triazoles, pyrazoles, imidazoles, isooxazoles, isothiazoles, thiazoles and thiadiazoles.

8. The process of claim 7 wherein said composition is included in the water system in a concentration of from about 4 to about 75 parts per million.

9. The process of claim 8 wherein the water soluble molybdate ion of the composition is added as a molybdate selected from the group consisting of sodium molybdate, potassium molybdate, magnesium molybdate and ammonium molybdate.

10. The process of claim 9 wherein the water soluble polyphosphate of the composition is a glassy polyphosphate.

11. The process of claim 10 wherein the azole of the composition is selected from the group consisting of 1,2,3-benzotriazole; 1,2,3-tolyltriazole; sodium 2-mercaptobenzothiazole; and sodium 2-mercaptobenzimidazole.

12. The process of claim 11 wherein the water soluble molybdate ion of the composition is added as sodium molybdate.

13. The process of claim 12 wherein the polyphosphate is sodium hexametaphosphate.

* * * * *